United States Patent
Boran

(10) Patent No.: US 9,187,070 B2
(45) Date of Patent: Nov. 17, 2015

(54) SYSTEM AND METHOD FOR MAINTAINING OPERATIONAL STATES OF VEHICLE REMOTE ACTUATORS DURING FAILURE CONDITIONS

(71) Applicant: Autoliv ASP, Inc., Ogden, UT (US)

(72) Inventor: Colm Boran, Novi, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 13/828,627

(22) Filed: Mar. 14, 2013

(65) Prior Publication Data

US 2014/0277979 A1   Sep. 18, 2014

(51) Int. Cl.
*B60R 16/03* (2006.01)
*B60T 8/88* (2006.01)

(52) U.S. Cl.
CPC ........... *B60T 8/885* (2013.01); *B60T 2270/402* (2013.01); *B60T 2270/406* (2013.01)

(58) Field of Classification Search
CPC ..... B60T 8/17; B60T 8/885; B60T 2270/402; B60T 2270/406
USPC ............. 701/74, 75, 79; 303/10, 15, 152, 155
See application file for complete search history.

(56) References Cited

U.S. PATENT DOCUMENTS

| | | | |
|---|---|---|---|
| 6,877,823 B2* | 4/2005 | Giers | 303/122.03 |
| 6,907,330 B2* | 6/2005 | Eisenmann et al. | 701/36 |
| 8,608,255 B2* | 12/2013 | Shimada et al. | 303/152 |
| 2010/0314207 A1 | 12/2010 | Poertzgen et al. | |
| 2011/0160876 A1* | 6/2011 | Nakagawa et al. | 700/21 |
| 2013/0245910 A1* | 9/2013 | Watanabe | 701/79 |
| 2013/0325280 A1* | 12/2013 | Terasaka et al. | 701/74 |
| 2013/0325281 A1* | 12/2013 | Terasaka et al. | 701/75 |
| 2014/0008967 A1* | 1/2014 | Takeuchi et al. | 303/155 |

FOREIGN PATENT DOCUMENTS

EP   0 724 208 A1   7/1996

* cited by examiner

*Primary Examiner* — Thomas G Black
*Assistant Examiner* — Wae Louie
(74) *Attorney, Agent, or Firm* — Brinks Gilson & Lione

(57) ABSTRACT

A system and method for maintaining operational states of vehicle remote actuators during failure conditions is described. The system controller determines if the actuator controller is operating properly by monitoring an enable line and initiates a safe mode of operation if the actuator is not operating properly.

13 Claims, 3 Drawing Sheets

SYSTEM AND METHOD FOR MAINTAINING OPERATIONAL STATES OF VEHICLE REMOTE ACTUATORS DURING FAILURE CONDITIONS

BACKGROUND

1. Subject Matter of the Invention

The invention relates to system and methods for maintaining operational states of vehicle remote actuators during failure conditions.

2. Description of the Known Art

Vehicles, such as automobiles, have a variety of passive and active safety systems protecting the occupants of the vehicle if the vehicle is involved in a collision. Active safety systems work to prevent accidents; they selectively actuate controllers that assist the driver in steering and braking the automobile to help prevent accidents. If the controllers are not operating properly, they can degrade the ability for the driver to control the automobile, which may lead to an accident.

Prior art solutions generally utilize a single electronic control unit for processing signals and controlling actuation. This relies on a single electronic control unit to failsafe itself by cross checking its control and signals. This electronic control unit typically will contain additional logic to make sure it is operating properly. This logic can become quite complex because the electronic control unit is often the only system processing this information in this context and relies on self-checks to insure proper operation.

Further objects, features and advantages of this invention will become readily apparent to persons skilled in the art after a review of the following description, with reference to the drawings and claims that are appended to and form a part of this specification.

SUMMARY

A system for maintaining the operational state of an electronic control unit may include a first electronic control unit, which may be a system controller, and a second electronic control unit, which may be an actuator controller. The second electronic control unit is electrically connected to the first electronic control unit via a conductive member. The first electronic control unit may control power provided by the second electronic control unit by providing a signal to the second electronic control unit via the conductive member. This signal can be used to either power the second control unit or enable a power supply that will provide power to the second electronic control unit.

The second electronic control unit provides a signal to the first electronic control unit via the conductive member. The signal that is provided to the first electronic control unit is a current signal indicating a current draw of the second electronic control unit, which may indicate that the second electronic control unit is operational. The first electronic control unit is configured to monitor the conductive member for the signal from the electronic control unit and to not provide current to the second electronic control unit if the first electronic control unit does not receive the signal from the second electronic control unit. By so doing, the first electronic control unit will only cut the power to the second electronic control unit if the second electronic control unit is not operational. Otherwise, the first electronic control unit will still provide power to the second electronic control unit.

Further objects, features and advantages of this invention will become readily apparent to persons skilled in the art after a review of the following description, with reference to the drawings and claims that are appended to and form a part of this specification.

DETAILED DESCRIPTION

Figure 1:
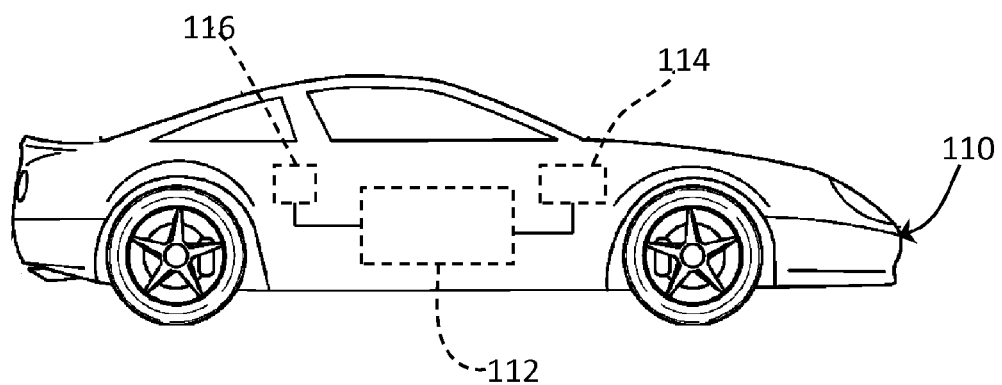
FIG. 1 illustrates a vehicle having a system to determine the operating status of an electrical system having both a system controller and an actuator controller.

Referring to FIG. 1, a vehicle 110 incorporating a system 112 for maintaining operational states of vehicle remote actuators during failure conditions is shown. The system 112 includes an actuator control system which actuates an actuator, which may be a vehicle safety system. For example, the actuator may be a steering system or brake system 114 or an occupant restraint system 116, such as a pretension device for a vehicle safety belt system.

While the illustration of FIG. 1 shows the vehicle 10 as being an automobile, it should be understood that the system 12 can be incorporated in any number of different variations of vehicles capable of transporting occupants from one place to another. For example, the vehicle 10 may be a truck, car, sport utility vehicle, or construction/farming vehicle. Additionally, it should be understood that the system 12 could be equally incorporated in systems beyond those that are found in land based vehicles, such as aircraft and water craft. Finally, the system could be incorporated in devices that are not vehicles at all, such as medical equipment or consumer electronics.

Figure 2A:
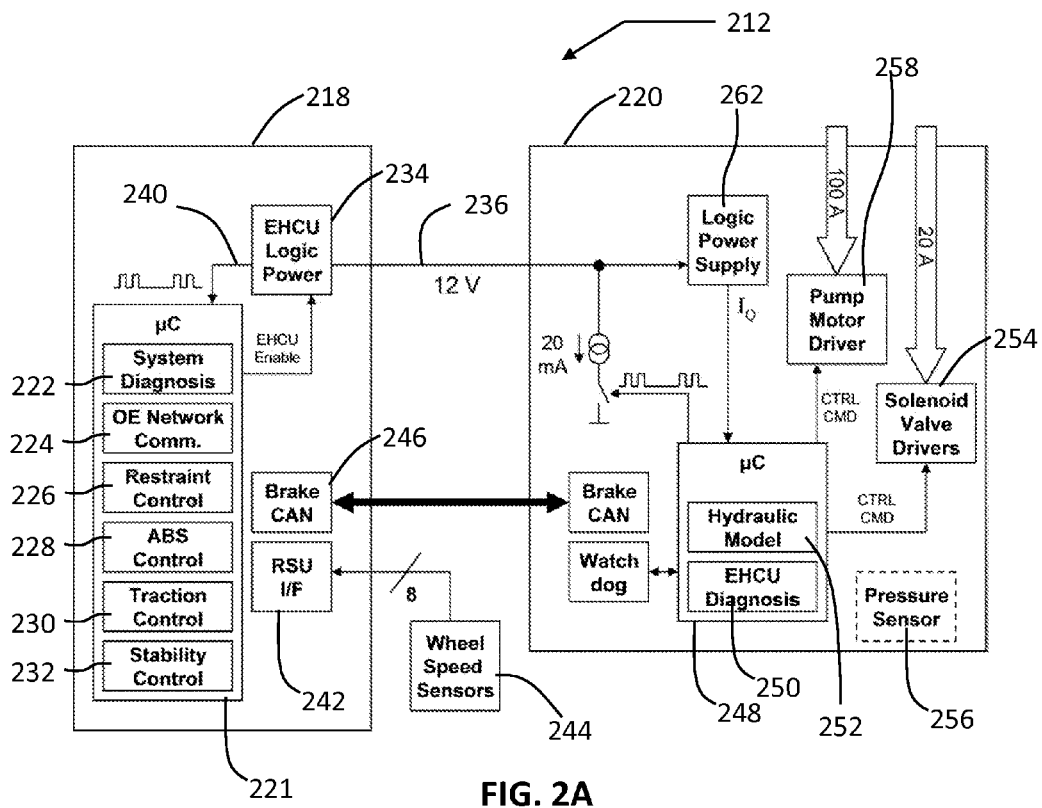
FIG. 2A is an embodiment of the system for determining the operating status of an electrical system having both a system controller and an actuator controller.

Referring to FIG. 2A, the system 212 includes a system controller 218 and a actuator controller 220. The system controller 218 may include a microprocessor 221 that may be configured to perform a variety of different functions. For example, the microprocessor 221 may include hardware and software configuring the microprocessor to perform system diagnostics 222, network communications 224, control the restraint systems 226, control the antilock brake systems of an automobile 228, the traction control system of an automobile 230, or the stability control system 232 of an automobile. It should be understood that the list provided regarding the functions of the microprocessor may include all, some or just one of the above enumerated systems, but may further involve other systems not previously mentioned. Further, it should be understood that while the system 212 may be incorporating an automobile, as stated previously, the system may be incorporated in to other products as well.

The system controller 218 also includes a logic power device 234 that is in electrical communication with the microprocessor 221. The logic power device 234 receives a signal over a conductive member 236 from the microprocessor 221 that allows the logic power device to provide an output. The logic power device 234 further has an output 240 that is in electrical communication with the processor 221. The processor 221 is, as we will explain in greater detail later, configured to receive the output 240 from the logic power device 234 and determine if the actuator controller 220 is operating properly. If the actuator controller 220 is not operating properly, the microprocessor 221 will then disable the logic power device 234 via the signal sent over conductive member 236.

The system controller 218 may also include an input processing device 242 configured to receive information from one or more sensors 244. In this embodiment, the sensors 244 are wheel speed sensors. Further, the system controller 218 may also have an input 246 for receiving information from the actuator controller 220. This input 246 is in this embodiment configured to receive braking information over a controller area network ("CAN network"). This braking information can include antilock braking information received from the actuator controller 120. Of course, it should be understood that another communication or network protocol can be used. Further, the type of information being transmitted may vary. Examples of this type of information may include, but is not limited to, engine, safety system, traction control, and/or stability control information.

Turning our attention to the actuator controller 220, the actuator controller 220 includes a microprocessor 248. The microprocessor 248 may include a diagnosis unit 250 that is configured to diagnose issues the control unit 220 may be experiencing. The microprocessor 248 may also include a control unit such as a hydraulic controller 252 that may be configured to control solenoid valve drivers 254. These solenoid valve drivers may be used to actuate the brakes of a vehicle. The control unit 220 may also have a pressure sensor 256 to provide pressure information regarding the brakes of the vehicle. Further, the microprocessor 248 may also be in electrical communication with a pump motor driver 258 for driving a pump that may be configured to provide hydraulic pressure to a vehicle braking unit.

The microprocessor 248 receives power from the logic power supply 262. The logic power supply 262 receives a signal over conductive member 236 from the logic power device 234. The microprocessor 248 is further configured to provide a small current signal, usually in the order of about 20 mA to the logic power device 234 via conductive member 236. The microprocessor 248 is configured to only provide this signal to conductive member 236 if the microprocessor is operating such that the system controller 220 can provide appropriate control to any actuators or pumps that it drives.

Figure 2B:
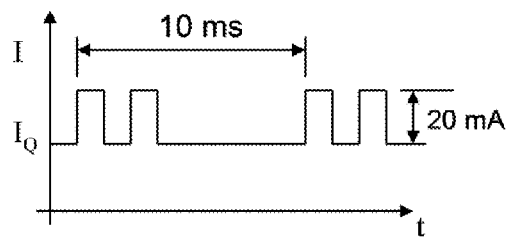
FIG. 2B illustrates the signal sent from the second control unit to the first control unit if the second control unit is operational.

Referring to FIG. 2B, an example of the signal provided to conductive member 236 via the microprocessor 148 when the actuator controller 120 is operating properly is shown. The signal is generally a current signal that provides a small 20 mA amplitude to the conductive member 236. The small variation in the signal on conductive member 236 can be received by the logic power device 234 and then relayed to the processor 221. If the signal is not received, the logic power device 234 will send a signal to the logic power supply 262 to no longer provide current to the microprocessor 248, essentially shutting down actuator controller 220. Generally, this is only done in cases where the actuator controller 220 is no longer operating properly and needs to be shut down.

Figure 3:
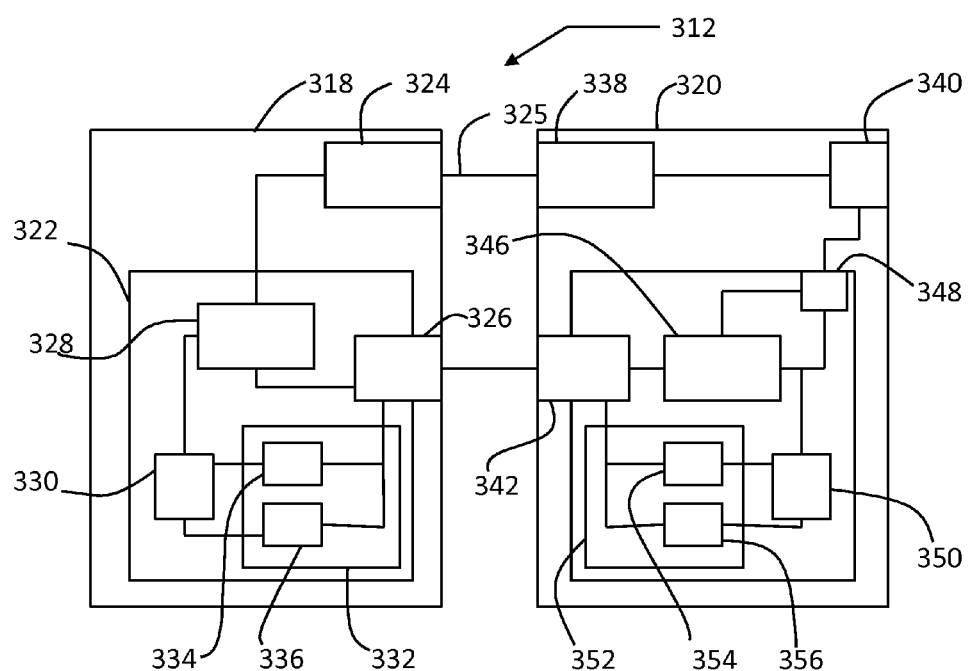
FIG. 3 is a more detailed of another embodiment of the system for determining the operating status of an electrical system having both a system controller and an actuator controller.

Referring to FIG. 3, another embodiment the system 312 is shown. This embodiment is similar to the one above but includes an additional watchdog controller. As its primary components, the system 312 includes a system controller 318 and an actuator controller 320. The system controller 318 generally includes a system microprocessor 322. The system microprocessor 322 is in electrical communication via line 325 with an actuator enabling device 324 and a system communication handler 326. The actuator enabling device 324 is configured to send a signal to the actuator controller 320 to either enable or disable the actuator controller 320. The system communication handler 326 is configured to transmit signals from the system microprocessor 322 to the actuator controller 320.

The system microprocessor 322 further includes a system control logic 328, a system internal check 330 and a system watchdog controller 332. The system control logic 328 is in communication with both the system communication handler 326 and the system internal check 330. The system control logic 328 is configured to provide a series of control signals that will eventually be sent to the actuator controller 320. In addition, the system control logic 328 is used to determine when to actuate a vehicle safety system, such as a steering system or break system, by actuating an actuator controlled by the actuator controller 320.

The system watch dog controller includes an actuator watchdog check 334 and a system key generator 336. The actuator watchdog check 334 receives an actuator key from the actuator controller 320 and determines if the actuator controller 320 is operating properly, as will be described in more detail in the paragraphs that follow. The system key generator 336 performs the function of generating a system key which will be eventually sent to the actuator controller 320, so that the actuator controller 320 can confirm that the system controller 318 is operating properly.

The system key may be based on system checks of the system control logic 328 and/or the system microprocessor 322, which may include read-only memory, a random access memory, or an arithmetic logic unit. Further, the system key value may be based in part on the actuator key generated by the actuator controller 320. The system controller watchdog 332 also provides actuator watchdog status to the system internal check 330 as part of the overall logic tests.

The actuator watchdog check 334, after receiving the actuator key value, will make a determination if the actuator key value is the expected actuator key value. Generally, the actuator key value may be based on a system rate of the actuator controller 320, system checks of a logic unit of the actuator controller 320, wherein the logic unit of the actuator controller 320 may be a read-only memory, a random access memory, or an arithmetic logic unit. Additionally, as will be explained later, the actuator key value may be based in part on the system key value generated by the system key generator 336.

In either case, the actuator watchdog check 334 will send a signal to the system internal monitor 230, which will then relay the signal to the system control logic 328. From there, the system control logic 328 will communicate with the actuator enabling device 324, which can then disable the actuator controller 320 if the actuator key value is not the expected actuator key value. This disabling of the actuator controller 320 may include not sending any signals to the actuator or may include powering off of the actuator controller 320.

The actuator controller 320 includes a power control 338, an actuator 340, an actuator communication handler 342, and an actuator microprocessor 344. The actuator microprocessor 344 is in communication with the actuator communication handler 342 which communicates with the system controller communication handler 326. The actuator microprocessor 344 is also in communication with the actuator 340. Essentially, the actuator microprocessor can activate or deactivate the actuator 340. The power control 338 provides power to the actuator 340, allowing the actuator 340 to activate or deactivate based on signals received from the actuator microprocessor 344.

The actuator microprocessor 344 includes an actuator control logic 346, a driver 348, an actuator internal check 350, and an actuator controller watchdog 352. The driver 348 is in communication with the actuator control logic 346 and receives signals from the actuator control logic 346 to provide a signal to the actuator 340, thereby activating or deactivating the actuator 340. As stated before, the actuator 340 may interact with the safety device such as a steering system or brake system 314 of FIG. 1.

The actuator controller watchdog 352 includes a system watchdog check 254 and an actuator key generator 356. The system watchdog check 354 receives the system key from the system controller 118 and determines if the system key is the expected system key. The actuator key generator 356 generates an actuator key which is then provided to the communication handler 342 of the actuator controller 320. The actuator key may be based on system checks of the actuator control logic 346 and/or the actuator microprocessor 344 which may include read-only memory, a random access memory, or an arithmetic logic unit. Further, the actuator key value may be based in part on the system key generated by the system controller 318. The actuator controller watchdog 352 also provides system watchdog status to actuator internal check 350 as part of the overall logic tests.

The actuator internal check 350 receives information from the system watchdog check regarding if the system is operating properly based on a previous determination if the received system key is the expected system key. If the actuator internal check 350 receives information from the system watchdog check 354 that the system controller 320 is operating properly, the actuator internal check 350 then enables the driver 348 and the actuator control logic 346, by informing the driver 348 and the actuator control logic 346 that the system controller 320 is operating properly. After the determination is made by the actuator controller watchdog 352 that the system controller 320 is not operating properly, the actuator controller can communicate to the actuator control logic 346 via the actuator internal check 350 of the status. In case that the system controller 318 is not operating properly, the actuator controller 320 can simply ignore commands from the system controller 318, as the system controller 318 is not operating properly.

However, there may be situations where the actuator controller 320 is operating correcting but that the communications between the system controller 318 and actuator controller 320 has been compromised. If the communication between the system controller 318 and actuator controller 320 has been compromised, but the actuator controller 320 is both working correctly, it may be advantageous not to disable to actuator controller 320 entirely. In order to make this determination, a determination must be made is the system controller 318 and actuator controller 320 are communication via the conductive member 325, which is the enable line that is connected to the actuator enabling device 324. If the actuator controller 320 can still maintain a lever of communication via line 325 with the system controller, the system controller 318 may not disable the actuator controller 320.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of the invention. This description is not intended to limit the scope or application of the invention in that the invention is susceptible to modification, variation and change, without departing from spirit of the invention, as defined in the following claims.

The invention claimed is:

1. A system for maintaining the operation state of an electronic control unit, the system comprising:
   a first electronic control unit;
   a second electronic control unit electrically connected to the first electronic control unit via a conductive member;
   wherein the first electronic control unit powers the second electronic control unit by providing current having a first magnitude to the second electronic control unit via the conductive member;
   wherein the second electronic control unit provides a signal to the first electronic control unit via the conductive member wherein the signal has a second magnitude added to the first magnitude of the current provided to the second electronic control unit;
   wherein the first electronic control unit is configured to monitor the conductive member for the second magnitude of the signal from the second electronic control unit; and
   wherein the first electronic control unit is configured to not provide current to the second electronic control unit if the first electronic control unit does not receive the second magnitude of the signal from the second electronic control unit.

2. The system of claim 1, wherein the first electronic control unit further comprises a current monitoring device for monitoring the amount of current provided to the second electronic control unit from the first electronic control unit via the conductive member.

3. The system of claim 1, wherein the second electronic control unit is an actuator control unit.

4. The system of claim 3, wherein the actuator control unit is an automobile brake control unit.

5. The system of claim 1, wherein the second control unit and first control unit are electrically connected to each other via a bus.

6. The system of claim 1, wherein the signal has a second magnitude and a frequency.

7. A method for maintaining the operation state of an electronic control unit, the method comprising the steps of:
   providing current having a first magnitude from a first electronic control unit to a second electronic control unit via a conductive member for powering the second electronic control unit;
   receiving by the first electronic control unit a signal from the second electronic control unit via the conductive member wherein the signal has a second magnitude added to the first magnitude of the current provided to the second electronic control unit;

removing current by the first electronic control unit to the second electronic control unit when the second magnitude of the signal is not received by the first electronic control unit.

8. The method of claim 7, wherein the signal is a current signal indicating a current draw of the second electronic control unit.

9. The method of claim 8, first comprising the step of monitoring by the first electronic control unit the amount of current provided to the second electronic control unit from the first electronic control unit via the conductive member.

10. The method of claim 7, wherein the second electronic control unit is an actuator control unit.

11. The method of claim 10, wherein the actuator control unit is an automobile brake control unit.

12. The method of claim 7, wherein the second electronic control unit and first electronic control unit are electrically connected to each other via a bus.

13. The method of claim 7, wherein the signal has a second magnitude and a frequency.

* * * * *